Patented Dec. 29, 1936

2,066,093

UNITED STATES PATENT OFFICE 2,066,093

METHOD FOR EXTRACTING TITANIUM COMPOUNDS FROM TITANIUM-CONTAINING ORE

Winfred Joseph Cauwenberg, Elizabeth, N. J., assignor to United Color & Pigment Company, Inc., Newark, N. J., a corporation of New Jersey No Drawing. Application March 4, 1935, Serial No. 9,266

7 Claims. (Cl. 23—117)

This invention relates to an improved method for extracting titanium compounds from titanium-containing ore, such as ilmenite.

The ordinary method for treating such ores consists in digesting them with concentrated sulphuric acid. The solid product of the reaction is dissolved in water to obtain solutions of titanium compounds which are valuable in pigment making and for other purposes.

The reaction between the ore and the sulphuric acid is exothermic and heats the reaction mass to such a degree that large quantities of steam and other gas are evolved within the mass during the reaction. The evolution of steam within the mass during the reaction tends to make the reaction product porous so that it is easily dissolved by water. The degree of this porosity depends upon the viscosity of the mass, which determines the extent to which the evolved steam is retained within the mass. The viscosity of the mass apparently depends upon irregular factors, as it has been found in practice that, without intentional charge of conditions, there are large variations in the porosity of the reaction product.

I have discovered that the viscosity of the mass may be so controlled as to permit the regular and invariable production of a highly porous reaction product which may easily be dissolved in water. My invention involves adding to the mass, before the reaction, a material that so increases the viscosity of the mass during the reaction that a substantial quantity of the steam evolved in the mass during the reaction is retained within the mass. The material which I have found most satisfactory for this purpose is an organic material which reacts with sulphuric acid to produce a large volume of finely divided carbon. Such materials include the carbohydrates. Of them, I have found dextrine most desirable.

To explain my invention still more clearly, I will describe in detail an illustrative method of extraction embodying it:

Ilmenite ore ground to 200 mesh is mixed with twice its weight of 66° Bé. sulphuric acid, and the mixture is heated rapidly to a temperature of from 120° C. to 130° C. A small amount of dextrine (about 0.6% of the weight of the ore), in dry form, is then added to the mass. The reaction between the dextrine and the sulphuric acid results in a voluminous production of finely divided carbon whose effect is greatly to increase the viscosity of the mass. The heat created by the reaction between the sulphuric acid and the small amount of dextrine is sufficient to initiate the reaction between the ore and the sulphuric acid, and this reaction then proceeds with the liberation of further heat so that no further external application of heat is required for the completion of the reaction. Steam is rapidly evolved within the mass. The increased viscosity produced by the presence of the large volume of finely divided carbon causes the mass to retain within it a substantial amount of the evolved steam so that, when the mass cools at the end of the reaction, it produces a porous cake. The porous reaction product is dissolved in water, giving a solution of titanium compounds which is valuable for many purposes.

What I claim is:

1. The method of extracting soluble titanium compounds from titanium ore, which consists in mixing the ore with sulphuric acid, adding a carbon-producing organic material which reacts with the sulphuric acid to produce finely-divided carbon of the type which increases the viscosity of the reaction mass to initiate the reaction between the sulphuric acid and the ore, and, after completion of the reaction, dissolving the reaction product in water.

2. The method of digesting titanium ore, which comprises mixing the ore with sulphuric acid, heating the mixture to approximately 125° C., and then adding a small proportion of an organic compound to react with the sulphuric acid to produce carbon of the type which increases the viscosity of the reaction mass, to initiate the reaction between the ore and the acid.

3. The method of extracting titanium compounds from titanium ore, which comprises mixing the ore with sulphuric acid, heating the mixture to approximately 125° C., adding a small amount of carbo-hydrate to react with the sulphuric acid to initiate the reaction between the acid and the ore and to increase the viscosity of the mass, and dissolving the product of the reaction in water.

4. The method of extracting titanium compounds from titanium ore, which comprises mixing the ore with sulphuric acid, heating the mixture to approximately 125° C., adding a small amount of sugar to initiate the reaction between the acid and the ore and to increase the viscosity of the mass, and dissolving the product of the reaction in water.

5. The method of extracting titanium compounds from titanium ore, which comprises mixing the ore with sulphuric acid, heating the mixture to approximately 125° C., adding a small amount of dextrine to initiate the reaction between the acid and the ore and to increase the viscosity of the mass, and dissolving the product of the reaction in water.

6. The method of extracting titanium compounds from titanium ore, which comprises mixing the ore with substantially twice its weight of concentrated sulphuric acid, heating the mixture to approximately 125° C., adding dextrine amounting to 0.6% by weight of the ore, and, after the reaction, dissolving the reaction product in water.

7. The method of extracting titanium compounds from ilmenite ore, which comprises mixing the ore with sulphuric acid, heating the mixture, adding a small amount of carbohydrate to initiate a reaction between the acid and the ore which proceeds to completion without further application of external heat, and to produce finely divided carbon increasing the viscosity of the mass, and, after the completion of the reaction, dissolving the product of the reaction in water.

WINFRED JOSEPH CAUWENBERG.